United States Patent
Zeng et al.

(10) Patent No.: US 10,716,121 B2
(45) Date of Patent: Jul. 14, 2020

(54) RECEIVER, COMMUNICATION SYSTEM AND DETECTING METHOD

(71) Applicant: Realtek Semiconductor Corp., HsinChu (TW)

(72) Inventors: Chih-Hsiu Zeng, New Taipei (TW); Kwang-Cheng Chen, Tampa, FL (US); Der-Zheng Liu, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/368,872

(22) Filed: Mar. 29, 2019

(65) Prior Publication Data

US 2019/0335473 A1   Oct. 31, 2019

Related U.S. Application Data

(60) Provisional application No. 62/662,780, filed on Apr. 26, 2018.

(51) Int. Cl.
| | |
|---|---|
| *H04B 1/7097* | (2011.01) |
| *H04W 72/08* | (2009.01) |
| *H04L 29/08* | (2006.01) |
| *H04B 1/16* | (2006.01) |
| *H04W 88/08* | (2009.01) |

(52) U.S. Cl.
CPC .......... *H04W 72/082* (2013.01); *H04B 1/16* (2013.01); *H04L 67/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2010/0309861 | A1* | 12/2010 | Gorokhov | H04B 1/7103 370/329 |
| 2016/0037550 | A1* | 2/2016 | Barabell | H04W 72/046 455/450 |
| 2018/0159643 | A1* | 6/2018 | Huang | H04W 52/346 |

OTHER PUBLICATIONS

Byonghyo Shim; Insung Kang, "Joint modulation classification and multi-user detection using multi-modulation sphere decoding," 2009 IEEE 10th Workshop on Signal Processing Advances in Wireless Communications, 2009, pp. 668-671.

* cited by examiner

*Primary Examiner* — Ayanah S George
(74) *Attorney, Agent, or Firm* — Winston Hsu (57) ABSTRACT

The present disclosure provides a receiver. The receiver comprises an antenna, configured to receive a received signal on a downlink direction, wherein the received signal comprises an interfering downlink signal and a desired downlink signal; and a detecting circuit, coupled to the antenna, configured to perform a multiuser detection operation on the received signal on the downlink direction to generate a detected interfering signal and a detected desired signal; wherein the desired downlink signal is transmitted by a first station, intended for the receiver, and generated according to a first modulation order; wherein the interfering downlink signal is transmitted by a second station, intended for a second receiver other than the receiver, and generated according to a second modulation order.

15 Claims, 7 Drawing Sheets

RECEIVER, COMMUNICATION SYSTEM AND DETECTING METHOD

CROSS REFERENCE TO RELATED APPLICATIONS

This application claims the benefit of U.S. provisional application No. 62/662,780, filed on Apr. 26, 2018, which is incorporated herein by reference.

BACKGROUND OF THE INVENTION

1. Field of the Invention

The present disclosure relates to a receiver, a communication system and a detecting method, and more particularly, to a receiver, a communication system and a detecting method capable of reducing computation complexity under a low latency requirement.

2. Description of the Prior Art

To widely deploy autonomous vehicles (AVs) while ensuring safety/reliability, the required latency of vehicular networking is constrained to be at the order of milliseconds. However, recent accidents in the AV testing prove the insufficiency of on-board computing for a single AV, and therefore reliable and ultra-low latency vehicular network is necessary. In the reliable and ultra-low latency vehicular network, a group of APs are governed by an anchor node serving fog/edge computing to enable real-time control and management of AVs. Based on this configuration, the concept of virtual cell is adopted to integrate open-loop communications and subsequently proactive network association.

In uplink, each vehicle proactively associates with multiple APs creating a virtual cell to serve the vehicle by radio slicing in a virtual network. In downlink, the anchor node predicts the potential APs with which each vehicle is going to associate, and consequently sends packets to the proper APs and then to the vehicle. In such scenario, time-consuming handover process is no longer needed.

Note that, to lower the latency, radio resource allocation may not be perfectly optimized. For example, in a downlink direction, multiple APs within a virtual cell may simultaneously transmit data/signal intended for different vehicles/receivers on the same (radio) resource unit (e.g., a frequency spectrum). In the receiver's point of view, only data/signal from one AP is desired signal, and the rest data/signal from other AP(s) is interference.

Unfortunately, conventional interference suppression methods relying on channel state information (CSI) feedback mechanism, such as beamforming or interference alignment, become impractical for the URLLC (Ultra-Reliable Low-Latency Communications) system, due to the ultra-low latency constraint.

SUMMARY OF THE INVENTION

The present disclosure provides a receiver. The receiver comprises an antenna, configured to receive a received signal on a downlink direction, wherein the received signal comprises an interfering downlink signal and a desired downlink signal; and a detecting circuit, coupled to the antenna, configured to perform a multiuser detection (MUD) operation on the received signal on the downlink direction to generate a detected interfering signal and a detected desired signal; wherein the desired downlink signal is transmitted by a first station, intended for the receiver, and generated according to a first modulation order; wherein the interfering downlink signal is transmitted by a second station, intended for a second receiver other than the receiver, and generated according to a second modulation order.

The present disclosure provides a communication system. The communication system comprises a first receiver and a second receiver; and a first station and a second station. The first receiver comprises an antenna, configured to receive a received signal on a downlink direction, wherein the received signal comprises an interfering downlink signal and a desired downlink signal; and a detecting circuit, coupled to the antenna, configured to perform a multiuser detection (MUD) operation corresponding to the received signal on the downlink direction to generate a detected interfering signal and a detected desired signal; wherein the desired downlink signal is transmitted by the first station, intended for the first receiver, and generated according to a first modulation order; wherein the interfering downlink signal is transmitted by the second station, intended for a second receiver, and generated according to a second modulation order.

The present disclosure provides a detecting method. The detecting method comprises receiving a received signal on a downlink direction, wherein the received signal comprises an interfering downlink signal and a desired downlink signal; and performing a multiuser detection (MUD) operation on the received signal on the downlink direction to generate a detected interfering signal and a detected desired signal; wherein the desired downlink signal is transmitted by a first station, intended for the receiver, and generated according to a first modulation order; wherein the interfering downlink signal is transmitted by a second station, intended for a second receiver other than the receiver, and generated according to a second modulation order.

DETAILED DESCRIPTION

Figure 1:
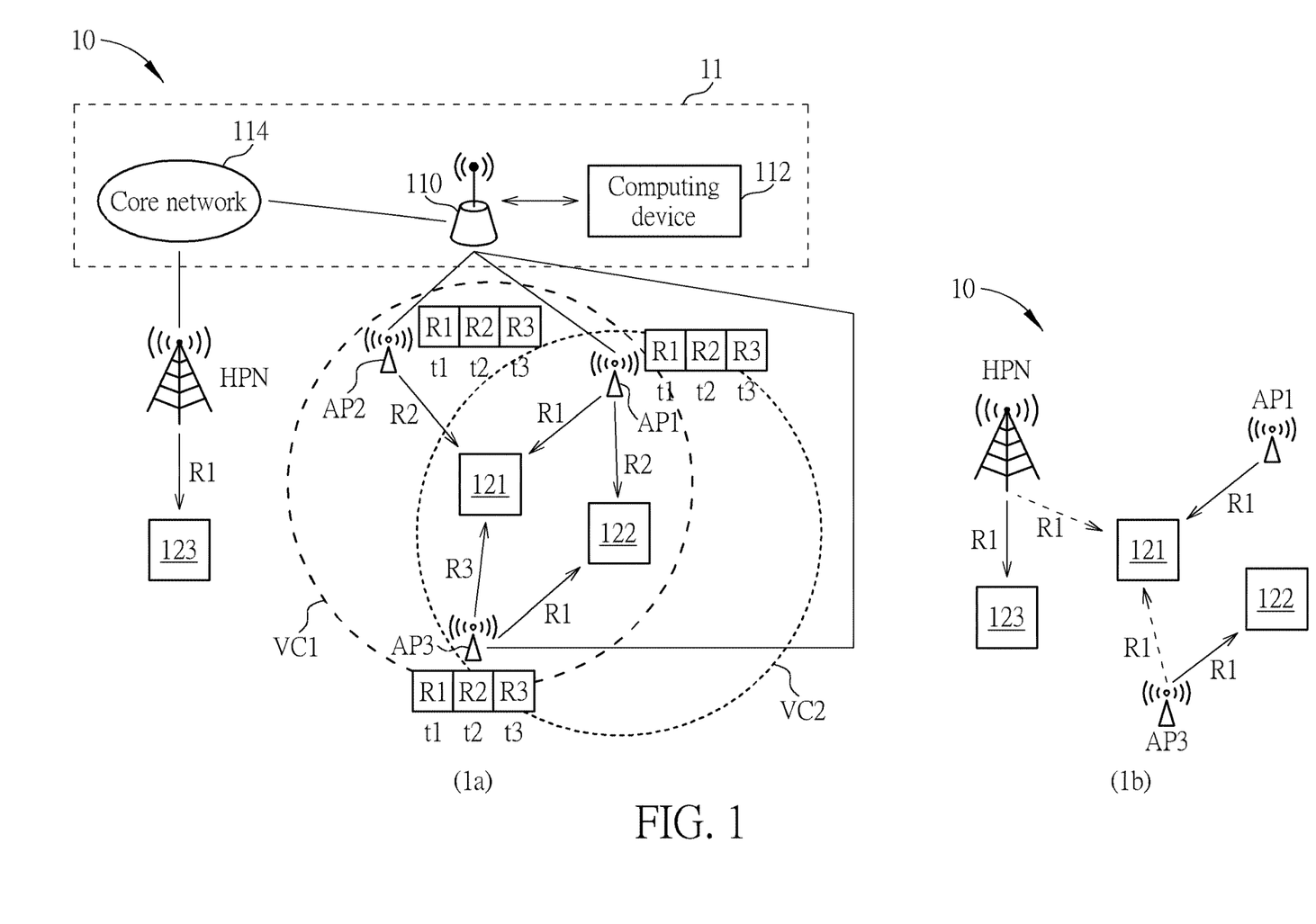
FIG. 1 is a schematic diagram of a communication system according to an embodiment of the present disclosure.

FIG. 1 is a schematic diagram of a communication system 10 according to an embodiment of the present disclosure. The communication system 10 comprises stations AP1-AP3 and receivers 121, 122. The stations AP1-AP3 may be low-power access points (APs), which are connected to a backhaul network 11. The backhaul network 11 may comprise an anchor node 110, a computing device 112 and a core network 114. The computing device 112 may be a computer or a server. The anchor node 110 and the computing device 112 may provide a fog/edge computing service to the stations AP1-AP3 and the receivers 121, 122. The backhaul network 11 may also connect to a station HPN, which may be a macro base station or an evolved node B (eNB), regarded as a high power node. The station HPN may provide wireless service, e.g., a high data rate service, to a receiver 123.

In an embodiment, the communication system 10 may be applied in a vehicular network. That is, the receiver 121 and the receiver 122 may be disposed on a first vehicle and a second vehicle (not shown in FIG. 1), respectively. In an uplink direction, which is from the receiver(s) to the station(s), each receiver, 121 or 122, may proactively associate with multiple APs (e.g., AP1-AP3) to form a virtual cell to serve itself. In a downlink direction, which is from the station(s) to the receiver(s), the anchor node 110 and/or the computing device 112 would predict the potential APs which each vehicle is going to associate with, and consequently send data packets to the proper APs, such that the AP can forward the packets to the receiver/vehicle. In an embodiment, the first vehicle and the second vehicle may be autonomous vehicles.

Specifically, the receiver 121 and the stations AP1-AP3 may form a first virtual cell representing a served area VC1. The served area VC1 is oriented from (or centered at) the receiver 121. The served area VC1 can move while the receiver 121 moves. The receiver 121 may associate with the stations (e.g., AP1-AP3) within the first virtual cell (or the served area VC1), such that the receiver 121 can be served by the stations within the served area VC1 (e.g., AP1-AP3). Similarly, the receiver 122 and the stations AP1, AP3 may form a second virtual cell representing a served area VC2, oriented from (or centered at) the receiver 122. The served area VC2 can move while the receiver 122 moves. The receiver 122 may associate with the stations (e.g., AP1 and AP3) within the served area VC2, such that the receiver 122 can be served by the stations within the served area VC2 (e.g., AP1 and AP3).

In an embodiment, as illustrated in the subfigure 1a, within the served area VC1, the station AP1 transmits data/signal to the receiver 121 on a radio resource unit R1 at a time t1, the station AP2 transmits data/signal to the receiver 121 on a radio resource unit R2 at a time t2, and the station AP3 transmits data/signal to the receiver 121 on a radio resource unit R3 at a time t1. Meanwhile, within the served area VC2, the station AP1 transmits data/signal to the receiver 122 on the radio resource unit R2 at the time t2, and the station AP3 transmits data/signal to the receiver 122 on the radio resource unit R1 at the time t1, where the station AP2 is beyond the served area VC2 and does not transmit data/signal to the receiver 122. The radio resource unit R1/R2/R3 herein may be referred to a specific spectrum or a specific set of OFDM (orthogonal frequency division multiplexing) subcarriers.

In this case, focusing on the radio resource unit R1 at the time t1, for example, from the receiver 121's perspective, the station AP3 may cause interference to the receiver 121 on the radio resource unit R1 at the time t1. In addition, if the station HPN also transmits data/signal to the receiver 123 on the radio resource unit R1 at the time t1, the station HPN would cause interference to the receiver 121 as well. In the subfigure 1b, solid arrows represent desired links, representing the receiver 121 receives a desired downlink signal from the station AP1 on the radio resource unit R1 at the time t1, and dashed arrows represent interfering links, representing the receiver 121 receives interfering downlink signals from the stations AP3 and HPN on the radio resource unit R1 at the time t1.

For illustrative purpose, supposed that the receiver 121 is only interfered by the station AP3, and the interfering signal from the station HPN is ignored in the following description. A received signal y, received by the receiver 121, can be expressed as $y = a_1 h_1 X_1 + a_2 h_2 X_2 + n$ (eq. 1), where $a_1$ and $a_2$ represent received signal amplitudes from the stations AP1 and AP3, respectively, $h_1/h_2$ represents channel vector between the station AP1/AP3 and the receiver 121, $X_1$ and $X_2$ represent downlink signals transmitted by the stations AP1 and AP3, respectively, and n may be the terminal noise which is zero mean complex Gaussian distributed. From eq. 1, it is assumed that the receiver 121 is equipped with multiple antennas, and a number of antennas corresponds to a number of elements of vector $y/h_1/h_2$. From the receiver 121's perspective, $X_1$ is the desired downlink signal, and $X_2$ is the interfering downlink signal.

As can be seen from eq. 1, the received signal y comprises the desired downlink signal $X_1$ and the interfering downlink signal $X_2$. In addition, the desired downlink signal $X_1$ is generated by a first modulation scheme, corresponding to a first modulation order $M_1$, and the interfering downlink signal $X_2$ is generated by a second modulation scheme, corresponding to a second modulation order $M_2$. The modulation order in the present disclosure refers to a number of different modulated symbols which can be transmitted using a specific modulation scheme. For example, supposed that the desired downlink signal $X_1$ is 64-QAM modulated, the first modulation order $M_1$ is 64. A modulation scheme corresponds to a constellation set. For example, a constellation set corresponding to a 4-PAM (Pulse-Amplitude Modulation) modulation scheme may be $\{\pm d, \pm 3d\}$, where d is a constant.

To distinguish/decode the desired downlink signal $X_1$ and the interfering downlink signal $X_2$ from the received signal y, the receiver 121 may perform a multiuser detection (MUD) operation on the received signal y.

Figure 2:
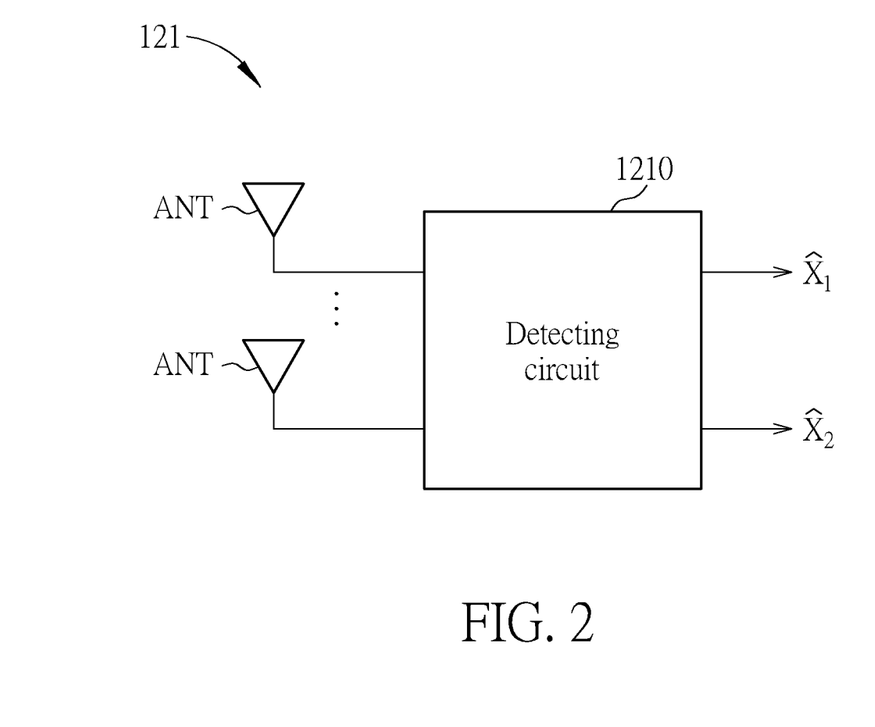
FIG. 2 is a schematic diagram of a receiver according to an embodiment of the present disclosure.

FIG. 2 is a schematic diagram of the receiver 121 according to an embodiment of the present disclosure. The receiver 121 comprises an antenna ANT and a detecting circuit 1210. The antenna ANT is configured to receive the received signal y, and the detecting circuit 1210 is configured to perform the MUD operation on the received signal y. In an embodiment, the detecting circuit 1210 may perform a maximum-likelihood (ML) MUD operation. Supposed that the noise n is complex Gaussian distributed, the detecting circuit 1210 may find a detected desired signal $\hat{X}_1$ and a detected interfering signal $\hat{X}_2$, such that the distance $\|y - a_1 h_1 X_1 - a_2 h_2 X_2\|$ is minimized. In other words, the detecting circuit 1210 may obtain the detected desired signal $\hat{X}_1$ and the detected interfering signal $\hat{X}_2$ by solving $$(\hat{X}_1, \hat{X}_2) = \operatorname*{argmin}_{(X_1, X_2) \in MS_1 \times MS_2} \|y - a_1 h_1 X_1 - a_2 h_2 X_2\|. \quad \text{(eq. 2)}$$

In eq. 2, $MS_1$ represents a first constellation set of the first modulation scheme corresponding to the desired downlink signal $X_1$, $MS_2$ represents a second constellation set of the second modulation scheme corresponding to the interfering downlink signal $X_2$, and $MS_1 \times MS_2$ represents a (Cartesian) product set of $MS_1$ and $MS_2$. In addition, $\|\cdot\|$ represents a norm operation and $\|u\|$ may be in general an $L_p$ norm for an arbitrary vector u. For example, ∥u∥ may be a Manhattan norm ($L_1$ norm), an Euclidean norm ($L_2$ norm) or an infinity norm ($L_\infty$ norm).

Figure 3:
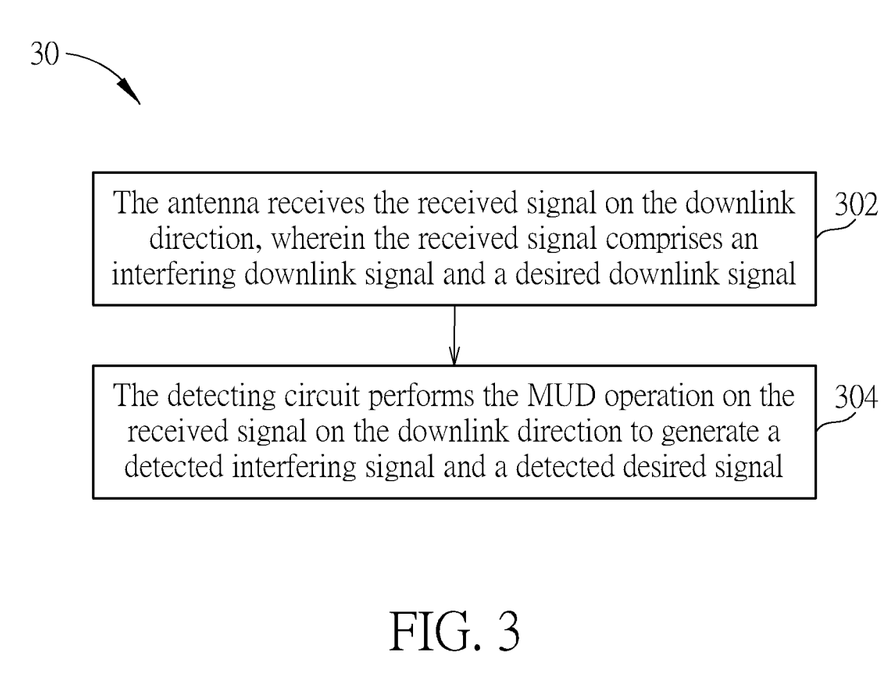
FIG. 3 is a flow diagram of a detecting process according to an embodiment of the present disclosure.

Operations of the receiver 121 can be summarized as a detecting process 30, as illustrated in FIG. 3. In the detecting process 30, Step 302 is executed by the antenna ANT and Step 304 is executed by the detecting circuit 1210. The detecting process 30 may, but not limited to, be realized by an ASIC (Application-Specific Integrated Circuit), a DSP (Digital Signal Processor), a MCU (Micro Control Unit), a processing unit and/or the like.

Note that, conventional MUD operations are used to solve multiple access interference (MAI) problems, which are usually applied in the receiving end (e.g., eNB) of the uplink direction. It means that, the conventional MUD operations are performed at the base station (e.g., eNB) to detect/decode signals transmitted from various mobile/user devices (e.g., user equipments or UEs), and it is crucial for the base station (eNB) to successfully detect/decode each of uplink signals transmitted from the various mobile/user devices. Different from the prior art, in the virtual cells scenario of the present disclosure, where the virtual cells mutually overlap, the MUD operation is performed at the receiving end of the downlink direction (e.g., the receiver 121). Furthermore, instead of detecting downlink signals from all stations, the detecting circuit 1210 is only interested in the desired downlink signal $X_1$, and the detected interfering signal $\hat{X}_2$ would be eventually discarded by the detecting circuit 1210.

In an embodiment, the MUD operation in eq. 2 involves an exhausted search over the Cartesian product set $MS_1 \times MS_2$. Supposed that $MS_1 = \{h\_1, \ldots, h\_M_1\}$ and $MS_2 = \{k\_1, \ldots, k\_M_2\}$, where $h\_m_1/k\_m_2$ represent a constellation point within $MS_1/MS_2$, the index $m_1$ ranges from 1 to $M_1$, and the index $m_2$ ranges from 1 to $M_2$. To perform the MUD operation in eq. 2, the detecting circuit 1210 may performs the exhaustedly search over the product set $MS_1 \times MS_2$ to find a pair $(\hat{X}_1, \hat{X}_2) \in MS_1 \times MS_2$ which minimizes $\|y - a_1 h_1 X_1 - a_2 h_2 X_2\|$. Note that, $MS_1 \times MS_2 = \{(h\_1, k\_1), \ldots, (h\_1, k\_M_2), (h\_2, k\_1), \ldots, (h\_2, k\_M_2), \ldots, (h\_M_1, k\_1), \ldots, (h\_M_1, k\_M_2)\}$, and a cardinality (i.e., a number of elements/entries within a set) of the product set $MS_1 \times MS_2$ is $M_1 \cdot M_2$, which means that the feasible set (i.e., $MS_1 \times MS_2$) for the MUD operation in eq. 2 is large, especially when high order modulation order is used. The large feasible set would significantly enlarge the computation complexity.

The heavy computation burden may not be a problem for base station (eNB), but it is impractical for mobile device such as the receiver 121, due to the computation complexity and power consumption concern. To bypass the computation complexity brought by the MUD operation in eq. 2, in an embodiment, the detecting circuit 1210 may form a reduced constellation set $MS_{2,R} = \{k\_1', \ldots, k\_M_{2,R}'\}$, and the detecting circuit 1210 may perform a reduced-complexity MUD operation by solving $$(\hat{X}_1, \hat{X}_2) = \underset{(X_1, X_2) \in MS_1 \times MS_{2,R}}{\operatorname{argmin}} \|y - a_1 h_1 X_1 - a_2 h_2 X_2\|. \quad \text{(eq. 3)}$$

In eq. 3, the cardinality $M_{2,R}$ of the reduced constellation set $MS_{2,R}$ is less than the cardinality $M_2$ of the second constellation set $MS_2$, i.e., $M_{2,R} = |MS_{2,R}| < M_2 = |MS_2|$, where $|S|$ represents a cardinality of an arbitrary set S. Constellation points $k\_1'\text{-}k\_M_{2,R}'$ can be regarded as representative constellation points for the constellation points $k\_1\text{-}k\_M_2$.

Different from eq. 2, the second constellation set $MS_2$ in eq. 2 is replaced with the reduced constellation set $MS_{2,R}$, as shown in eq. 3. Note that, correctness of the detected interfering signal $\hat{X}_2$ is not such critical for the detecting circuit 1210, but the computation complexity is. By replacing the second constellation set $MS_2$ with the reduced constellation set $MS_{2,R}$ and sacrificing an error rate of detecting detected interfering signal $\hat{X}_2$, the detecting circuit 1210 is able to simplify the complexity of the MUD operation.

Figure 4:
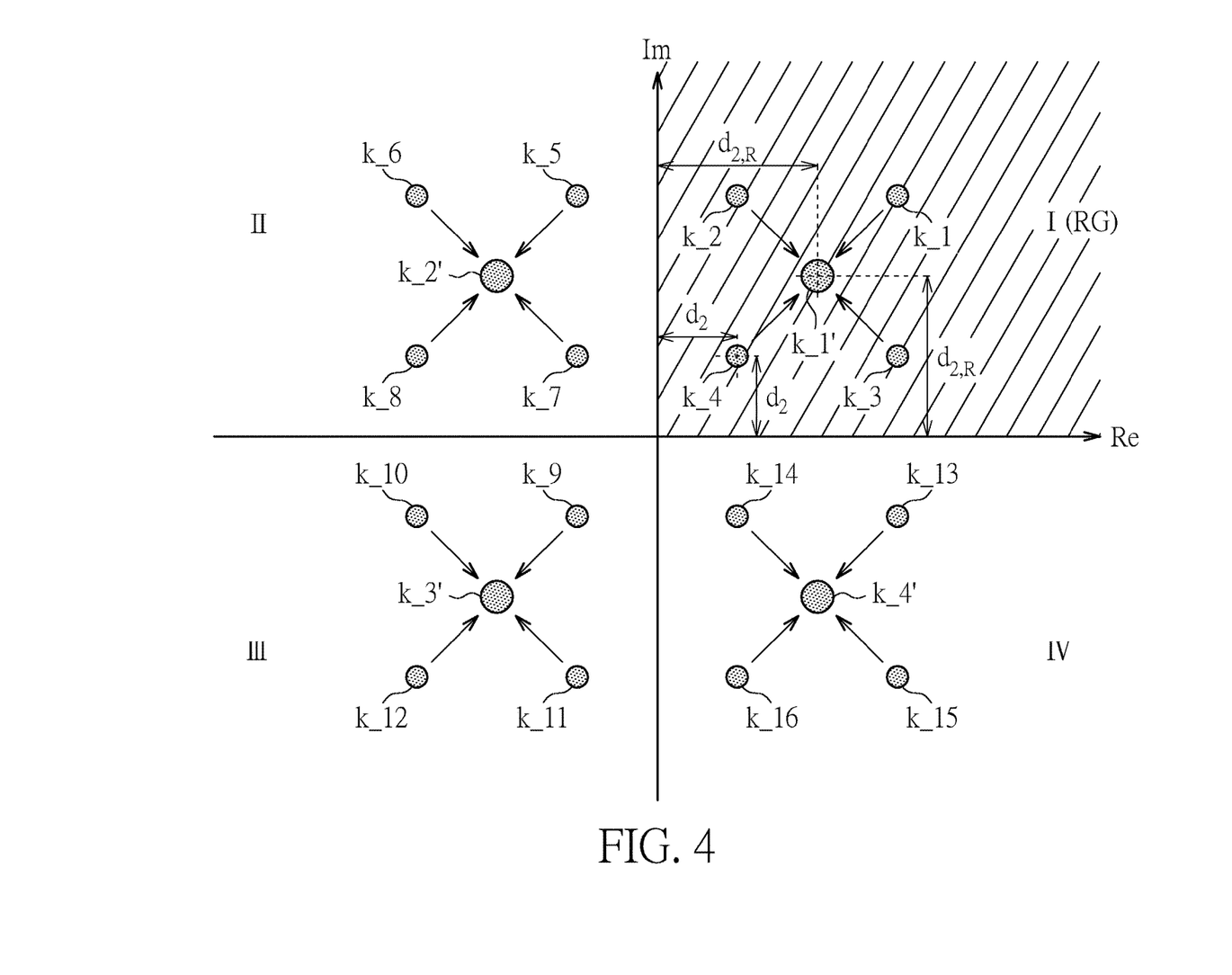
FIG. 4 is a schematic diagram of a plurality of constellation points and a plurality of representative constellation points.

Details of forming the reduced constellation set $MS_{2,R}$ and finding the representative constellation points $k\_1'\text{-}k\_M_{2,R}'$ are described as follows. Supposed that the interfering downlink signal $X_2$ is 16-QAM (Quadrature Amplitude Modulation) modulated (i.e., $M_2 = 16$). Referring to FIG. 4, in which the constellation points $k\_1\text{-}k\_M_2$ (i.e., $k\_1\text{-}k\_16$) within the second constellation set $MS_2$ and the constellation points $k\_1'\text{-}k\_M_{2,R}'$ (e.g., $k\_1'\text{-}k\_4'$) within the reduced constellation set $MS_{2,R}$ are illustrated. Take the constellation points $k\_1\text{-}k\_4$ within the second constellation set $MS_2$ in the quadrant/orthant I as an example, the constellation points $k\_1\text{-}k\_4$ may be expressed as $k\_1 = 3d_2 + j \cdot 3d_2$, $k\_2 = d_2 + j \cdot 3d_2$, $k\_3 = 3d_2 + j \cdot d_2$ and $k\_4 = d_2 + j \cdot d_2$, where $d_2$ is a constant corresponding to the second constellation set $MS_2$. The constellation points $k\_1\text{-}k\_4$ may be represented by the constellation point $k\_1'$, which means that the constellation point $k\_1'$ is the representative constellation point representing for the constellation points $k\_1\text{-}k\_4$, in the detecting circuit 1210's perspective, where $k\_1'$ may be expressed as $k\_1' = -d_{2,R} + j \cdot d_{2,R}$. The constant $d_{2,R}$ corresponding to the reduced constellation set $MS_{2,R}$ may be equal to $2 \cdot d_2$. Same rules can be applied to the constellation points within the quadrants II, III and IV, and therefore the representative constellation point $k\_2'\text{-}k\_4'$ may be obtained, as illustrated in FIG. 4. Thus, the reduced constellation set $MS_{2,R} = \{k\_1', k\_2', k\_3', k\_4'\}$ may be formed.

Method of the detecting circuit 1210 obtaining the representative constellation point is not limited. For example, the detecting circuit 1210 may choose a specific region RG (e.g., the quadrant I in FIG. 4), and obtain the constellation points within the specific region RG (e.g., $k\_1\text{-}k\_4$ in FIG. 4). The detecting circuit 1210 may obtain a center point (e.g., $k\_1'$ in FIG. 4), of the constellation points within the specific region RG, as the representative constellation point for constellation points within the specific region RG.

Figure 5:
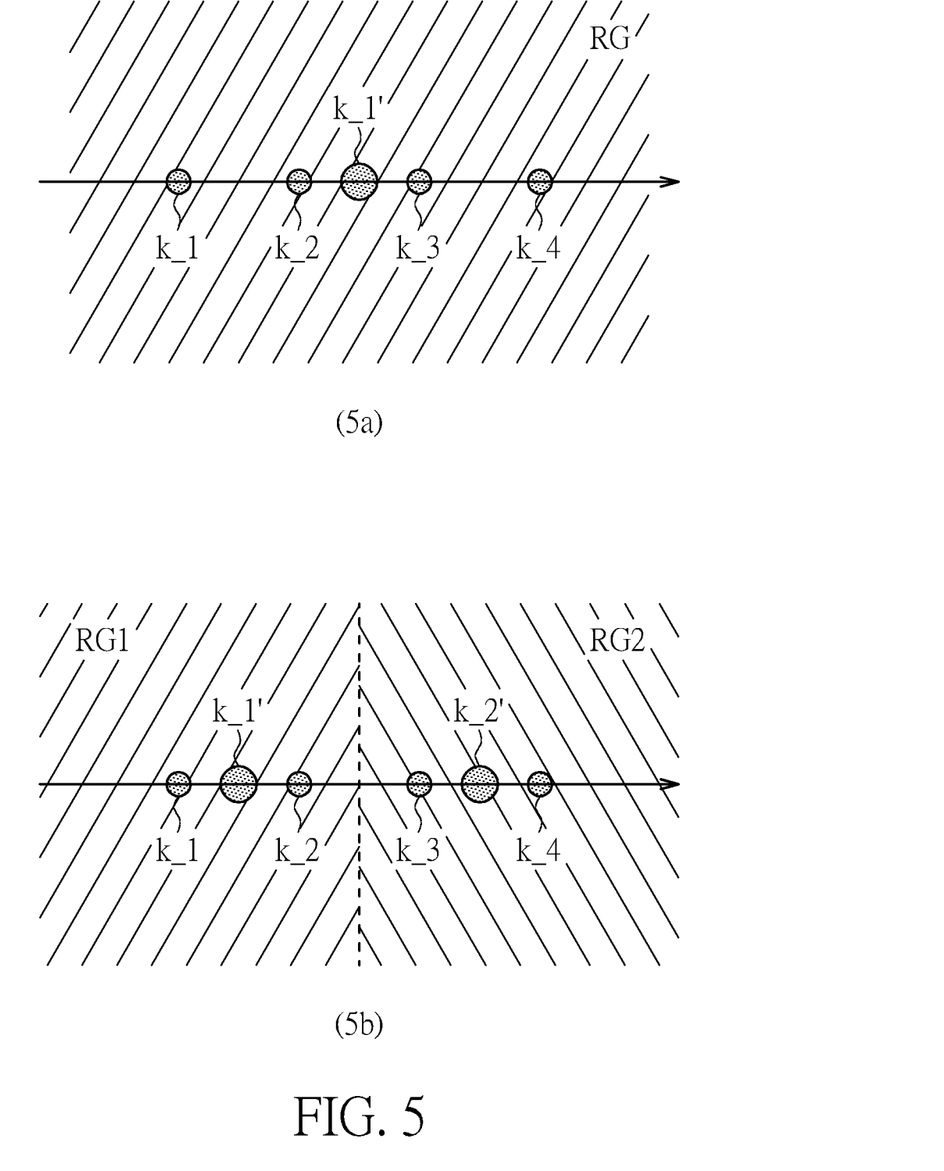
FIG. 5 is a schematic diagram of a plurality of constellation points and a plurality of representative constellation points.

In an embodiment, the detecting circuit 1210 may obtain the center point as an arithmetic mean of all the constellation points within the specific region RG. For example, $k\_1'$ may be an arithmetic mean/average of the constellation points $k\_1\text{-}k\_4$, expressed as $k\_1' = \operatorname{ave}_a(k\_1, k\_2, k\_3, k\_4) = (k\_1 + k\_2 + k\_3 + k\_4)/4$, where $\operatorname{ave}_a(\cdot)$ represents the arithmetic average operation. The arithmetic average is suitable for QAM or PAM, as illustrated in FIG. 4 (QAM) and FIG. 5 (PAM). In FIG. 5, the constellation points $k\_1\text{-}k\_4$ are PAM (Amplitude and Phase-Shift Keying) modulated. The constellation points $k\_1\text{-}k\_4$ may be expressed as $k\_1 = c - 3d$, $k\_2 = c - d$, $k\_3 = c + d$ and $k\_4 = c + 3d$, where c and d are constants. In the subfigure 5a, the representative constellation point $k\_1'$ represents for the constellation points $k\_1\text{-}k\_4$. In the subfigure 5b, the representative constellation point $k\_1'$ represents for the constellation points $k\_1\text{-}k\_2$ in a region RG1, i.e., $k\_1' = \operatorname{ave}_a(k\_1, k\_2)$, and the representative constellation point $k\_2'$ represents for the constellation points $k\_3\text{-}k\_4$ in a region RG2, i.e., $k\_2' = \operatorname{ave}_a(k\_3, k\_4)$.

Figure 6:
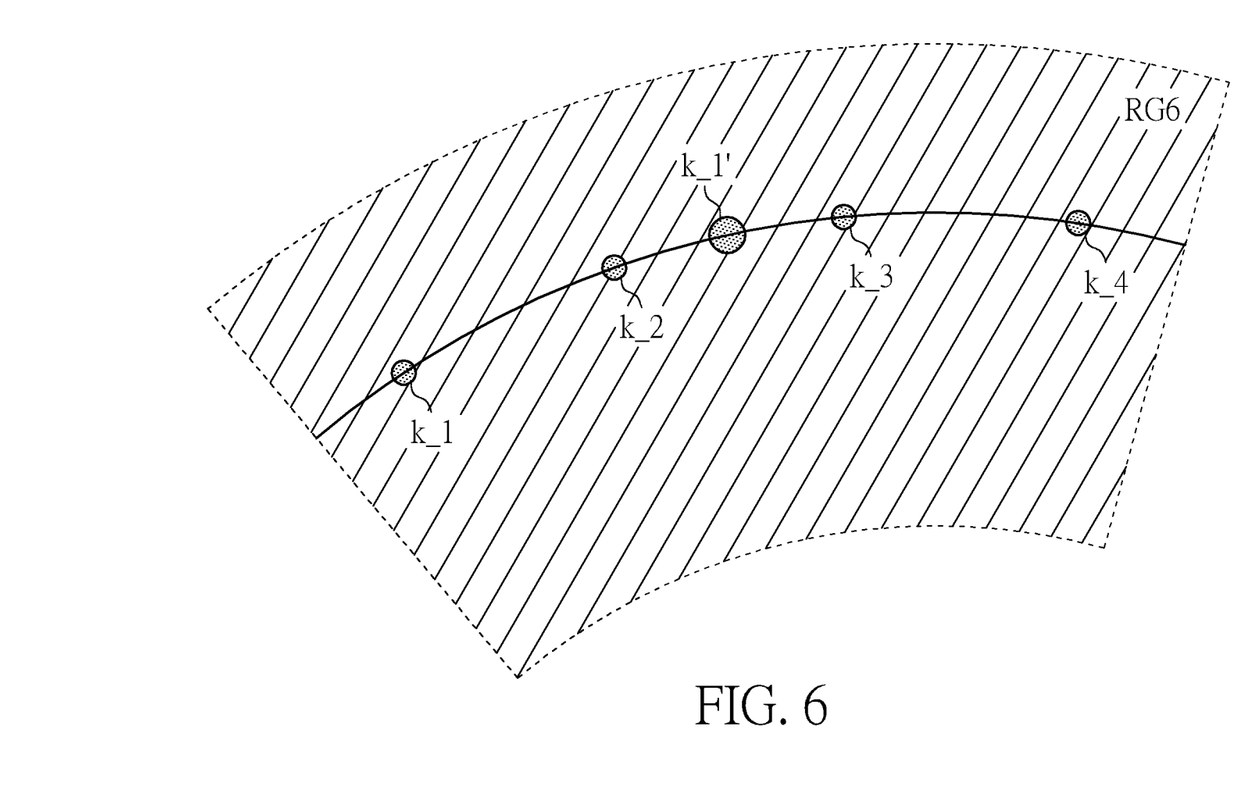
FIG. 6 is a schematic diagram of a plurality of constellation points and a representative constellation point.

In an embodiment, the detecting circuit 1210 may obtain the center point as a geometric mean of all the constellation points within the specific region. As illustrated in FIG. 6, the representative constellation point k_1' may be the geometric mean/average of the constellation points k_1-k_4 within a region RG6, expressed as k_1'=ave$_g$ (k_1, k_2, k_3, k_4)= (k_1·k_2·k_3·k_4)$^{1/4}$, where ave$_g$(•) represents the geometric average operation. The geometric average is suitable for PSK (Phase-Shift Keying), or even FSK (Frequency-Shift Keying) modulation scheme. In the embodiment illustrated in FIG. 6, the constellation points k_1-k_4 are PSK modulated and expressed as k_1=r·exp($\theta_1$), k_2=r·exp($\theta_2$), k_3=r·exp($\theta_3$) and k_4=r·exp($\theta_4$).

Figure 7:
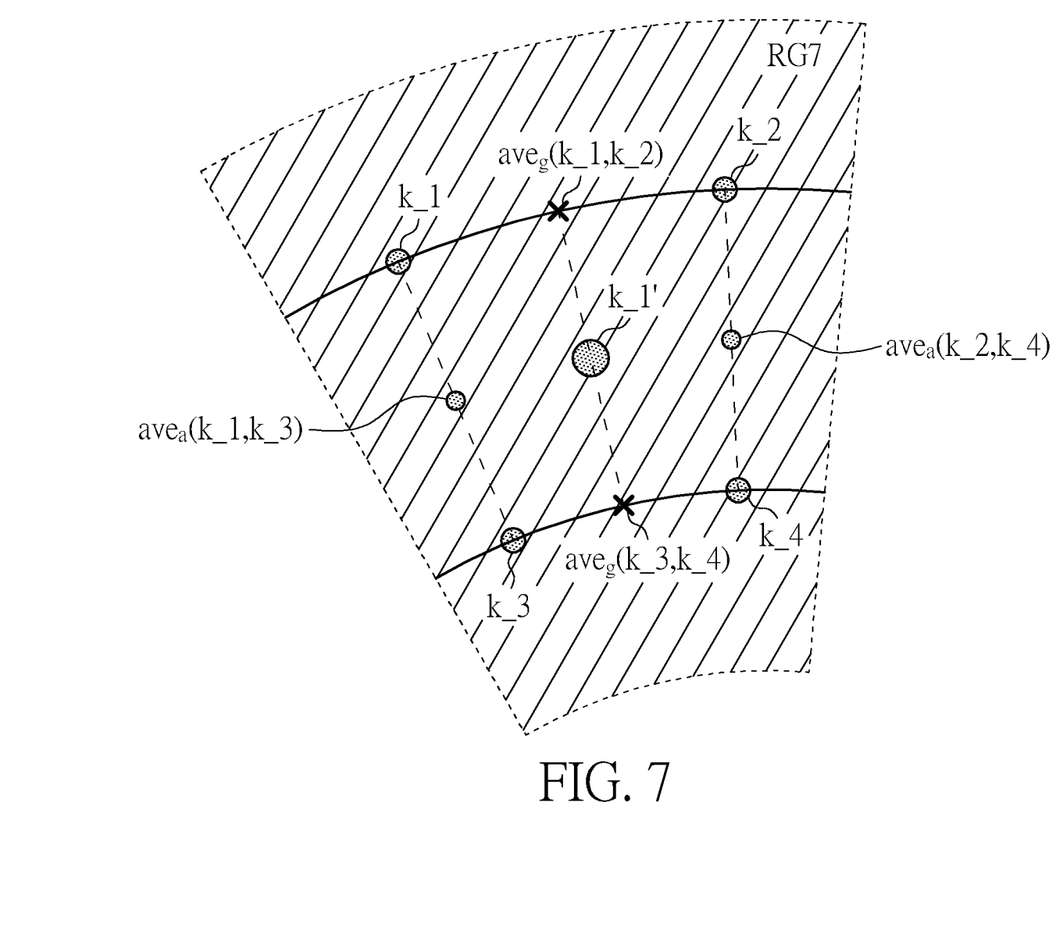
FIG. 7 is a schematic diagram of a plurality of constellation points and a representative constellation point.

In an embodiment, the detecting circuit 1210 may obtain the center point by computing k=ave$_a$(ave$_g$(k_1, k_2), ave$_g$ (k_3, k_4)) (eq. 4) or k=ave$_g$(ave$_a$(k_1, k_3), ave$_a$(k_2, k_4)) (eq. 5), as illustrated in FIG. 7. In FIG. 7, the constellation points k_1-k_4 are APSK (Amplitude and Phase-Shift Keying) modulated. The constellation points k_1-k_4 within a region RG7 may be expressed as k_1=r$_1$·exp($\theta_1$), k_2=r$_1$·exp($\theta_2$), k_3=r$_2$·exp($\theta_3$) and k_4=r$_2$·exp($\theta_4$). Eq. 4 and eq. 5 are suitable for the APSK modulation scheme.

After the detecting circuit 1210 obtains the representative constellation points k_1'-k_M$_{2,R}$' and forms the reduced constellation set MS$_{2,R}$, the detecting circuit 1210 can perform the reduced-complexity MUD operation in eq. 3 via the search operation over the reduced product set MS$_1$×MS$_{2,R}$. Since the feasible set, i.e., the product set MS$_1$×MS$_{2,R}$, is reduced, the reduced-complexity MUD operation in eq. 3 may be affordable for the detecting circuit 1210.

Furthermore, the rationale of eq. 3 can be extended to multiple interfering stations. For example, the received signal y may be expressed as y=a$_1$h$_1$X$_1$+a$_2$h$_2$X$_2$+a$_K$h$_K$X$_K$+n, where X$_2$-X$_K$ are interfering downlink signals, h$_2$-h$_K$ are channel vectors from interfering stations to the receiver 121, and a$_2$-a$_K$ are amplitudes of interfering signals. The detecting circuit 1210 may solve $$(\hat{X}_1, \hat{X}_2, \ldots \hat{X}_K) = \underset{(X_1, X_2) \in MS_1 \times MS_{2,R} \times \ldots \times MS_{K,R}}{\mathrm{argmin}} \quad (\text{eq. 6})$$

$$\|y - a_1 h_1 X_1 - a_2 h_2 X_2 - \ldots - a_K h_K X_K\|.$$

The detecting circuit 1210 may exploit the similar or same method stated above to obtain the reduced constellation sets MS$_{3,R}$-MS$_{K,R}$, where M$_{k,R}$=|MS$_{k,R}$|<M$_k$=|MS$_k$|, and the cardinality M$_k$ and the second constellation set MS$_k$ are corresponding to the interfering downlink signal X$_k$, for the index k ranging from 3 to K.

In summary, due to the fact that the virtual cells of the present disclosure mutually overlap, the mobile receiver may perform the MUD operation to detect/decode the desired downlink signal, and discard the interfering downlink signal. Furthermore, by reducing the constellation set corresponding to the interfering downlink signal (s), the computation complexity is reduced.

What is claimed is:

1. A receiver, comprising:
   an antenna, configured to receive a received signal on a downlink direction, wherein the received signal comprises at least one interfering downlink signal and a desired downlink signal; and
   a detecting circuit, coupled to the antenna, configured to perform a multiuser detection (MUD) operation on the received signal on the downlink direction to generate a detected interfering signal and a detected desired signal;
   wherein the desired downlink signal is transmitted by a first station, intended for the receiver, and generated according to a first modulation order;
   wherein the interfering downlink signal is transmitted by a second station, intended for a second receiver other than the receiver, and generated according to a second modulation order;
   wherein the detecting circuit performs the MUD operation via a searching operation over a product set of a first constellation set and a second constellation set, a first cardinality of the first constellation set is equal to the first modulation order, and a second cardinality of the second constellation set is equal to or less than the second modulation order.

2. The receiver of claim 1, wherein the second constellation set is a reduced constellation set, and the second cardinality of the reduced constellation set is less than the second modulation order.

3. The receiver of claim 2, wherein the detecting circuit obtains a plurality of representative constellation points according to a plurality of constellation points within a second constellation set corresponding to the interfering downlink signal, and forms the reduced constellation set, and the reduced constellation set comprises the plurality of representative constellation points.

4. The receiver of claim 1, wherein the at least one interfering downlink signal comprises a plurality of interfering downlink signals, the interfering downlink signals are generated according to a plurality of third modulation orders, the detecting circuit performs the MUD operation via a searching operation over a product set of a first constellation set and a plurality of third constellation sets, and any of third cardinalities of the third constellation sets corresponding to the interfering downlink signals is equal to or less than the corresponding third modulation order.

5. A communication system, comprising:
   a first receiver and a second receiver; and
   a first station and a second station;
   wherein the first receiver comprises:
      an antenna, configured to receive a received signal on a downlink direction, wherein the received signal comprises at least one interfering downlink signal and a desired downlink signal; and
      a detecting circuit, coupled to the antenna, configured to perform a multiuser detection (MUD) operation corresponding to the received signal on the downlink direction to generate a detected interfering signal and a detected desired signal;
      wherein the desired downlink signal is transmitted by the first station, intended for the first receiver, and generated according to a first modulation order;
      wherein the interfering downlink signal is transmitted by the second station, intended for a second receiver, and generated according to a second modulation order;
      wherein the detecting circuit performs the MUD operation via a searching operation over a product set of a first constellation set and a second constellation set, a first cardinality of the first constellation set is equal to the first modulation order, and a second cardinality of the second constellation set is equal to or less than the second modulation order.

6. The communication system of claim 5, wherein the second constellation set is a reduced constellation set, and the second cardinality of the reduced constellation set is less than the second modulation order.

7. The communication system of claim 6, wherein the detecting circuit obtains a plurality of representative constellation points according to a plurality of constellation points within a second constellation set corresponding to the interfering downlink signal, and forms the reduced constellation set comprising the plurality of representative constellation points.

8. The communication system of claim 5, wherein the at least one interfering downlink signal comprises a plurality of interfering downlink signals, the interfering downlink signals are generated according to a plurality of third modulation orders, the detecting circuit performs the MUD operation via a searching operation over a product set of a first constellation set and a plurality of third constellation sets corresponding to the plurality of interfering downlink signals, and any of third cardinalities of the third constellation sets corresponding to the interfering downlink signals is equal to or less than the corresponding third modulation order.

9. The communication system of claim 5, wherein the first station and the second station are coupled to a backhaul network.

10. The communication system of claim 5, wherein
the first receiver, the first station and the second station form a first virtual cell corresponding to a first served area, wherein the first served area is oriented from the mobile receiver;
the second receiver, the first station and the second station form a second virtual cell corresponding to a second served area, wherein the second served area is oriented from the second receiver.

11. A detecting method, comprising:
receiving a received signal on a downlink direction, wherein the received signal comprises at least one interfering downlink signal and a desired downlink signal; and
performing a multiuser detection (MUD) operation on the received signal on the downlink direction to generate a detected interfering signal and a detected desired signal;
wherein the desired downlink signal is transmitted by a first station, intended for the receiver, and generated according to a first modulation order;
wherein the interfering downlink signal is transmitted by a second station, intended for a second receiver other than the receiver, and generated according to a second modulation order;
wherein the step of performing the MUD operation on the received signal further comprises:
performing a searching operation over a product set of a first constellation set and a second constellation set;
wherein a first cardinality of the first constellation set is equal to the first modulation order, and a second cardinality of the second constellation set is equal to or less than the second modulation order.

12. The detecting method of claim 11, wherein the second constellation set is a reduced constellation set, and the second cardinality of the reduced constellation set is less than the second modulation order.

13. The detecting method of claim 12, wherein the step of performing via the searching operation over the product set of the first constellation set and a reduced constellation set comprises:
forming the reduced constellation set.

14. The detecting method of claim 13, wherein the step of forming the reduced constellation set comprises:
obtaining a plurality of representative constellation points according to a plurality of constellation points within a second constellation set corresponding to the interfering downlink signal; and
forming the reduced constellation set, wherein the reduced constellation set comprises the plurality of representative constellation points.

15. The detecting method of claim 11, wherein the at least one interfering downlink signal comprises a plurality of interfering downlink signals, the interfering downlink signals are generated according to a plurality of third modulation orders, and the step of performing the MUD operation on the received signal further comprises:
performing a searching operation over a product set of a first constellation set and a plurality of third constellation sets corresponding to the plurality of interfering downlink signals;
wherein any of third cardinalities of the third constellation sets corresponding to the interfering downlink signals is equal to or less than the corresponding third modulation order.

* * * * *